US009930578B2

(12) United States Patent
Vashi et al.

(10) Patent No.: US 9,930,578 B2
(45) Date of Patent: Mar. 27, 2018

(54) ENHANCED VOICE ROAMING FOR UE DEVICES ASSOCIATED WITH A HOME NETWORK WITHOUT SRVCC

(71) Applicant: Apple Inc., Cupertino, CA (US)

(72) Inventors: Prashant H. Vashi, Sunnyvale, CA (US); Vikram B. Yerrabommanahalli, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 14/870,222

(22) Filed: Sep. 30, 2015

(65) Prior Publication Data

US 2016/0330655 A1 Nov. 10, 2016

Related U.S. Application Data (60) Provisional application No. 62/156,794, filed on May 4, 2015.

(51) Int. Cl.
*H04W 36/00* (2009.01)
*H04M 15/00* (2006.01)
*H04W 8/18* (2009.01)
*H04L 29/08* (2006.01)

(52) U.S. Cl.
CPC ....... *H04W 36/0022* (2013.01); *H04L 67/148* (2013.01); *H04M 15/56* (2013.01); *H04M 15/57* (2013.01); *H04M 2207/18* (2013.01); *H04M 2207/203* (2013.01); *H04W 8/18* (2013.01)

(58) Field of Classification Search
None
See application file for complete search history.

(56) References Cited

U.S. PATENT DOCUMENTS

| 6,842,618 | B2 | 1/2005 | Zhang |
| 7,197,318 | B2 | 3/2007 | Schwarz et al. |
| 9,408,241 | B2 * | 8/2016 | Ku .......................... H04W 8/26 |
| 2012/0314562 | A1 | 12/2012 | Zhao et al. |
| 2013/0208659 | A1 | 8/2013 | Nishida |
| 2014/0204901 | A1 | 7/2014 | Hedman et al. |

(Continued)

OTHER PUBLICATIONS

Office Action, Application No. DE 10 2016 206 894.6, dated Mar. 30, 2017, 5 pages.

*Primary Examiner* — Vinncelas Louis
(74) *Attorney, Agent, or Firm* — Meyertons Hood Kivlin Kowert & Goetzel, P.C.; Jeffrey C. Hood (57) ABSTRACT

Some embodiments relate to a cellular network which better utilizes packet-switched (PS) voice technologies, such as VoLTE, for roaming user equipment (UE) devices. When a roaming UE associated with a home cellular carrier that does not support PS to CS handover (SRVCC) desires to make a VoLTE call, the cellular network may determine probability of such a handover during the the call. The cellular network may selectively accept or reject the packet-switched wireless voice call based on the handover probability. If the probability of handover is high, the cellular network may reject the packet-switched wireless voice and trigger the UE to fall back to a circuit-switched network and re-originate the wireless voice call on the circuit-switched network. In the case of a mobile terminated call, the cellular network may provide signaling to the UE to perform a fallback to a circuit-switched network in order to receive the mobile terminated call.

20 Claims, 7 Drawing Sheets (56) References Cited

U.S. PATENT DOCUMENTS

2014/0219246 A1* 8/2014 Khay-Ibbat ....... H04W 36/0022
370/331
2014/0321428 A1 10/2014 Godin et al.

* cited by examiner

ENHANCED VOICE ROAMING FOR UE DEVICES ASSOCIATED WITH A HOME NETWORK WITHOUT SRVCC

PRIORITY DATA

The present application claims benefit of priority to provisional Application No. 62/156,794 titled "Enhanced Voice Roaming for UE Devices Associated with a Home Network without SRVCC" and filed on May 4, 2015, by Prashant H. Vashi and Vikram B. Yerrabommanahalli, which is hereby incorporated by reference in its entirety as though fully and completely set forth herein.

FIELD OF THE INVENTION

The present application relates to wireless devices, and more particularly to an apparatus, system, and method for providing packet-switched voice capabilities from a roaming network to a wireless device associated with a non-SRVCC carrier.

DESCRIPTION OF THE RELATED ART

The use of wireless communication systems is rapidly expanding. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

One example of a transition to next generation wireless technology is the transition from circuit-switched (CS) technology to packet-switched (PS) technology, such as voice over LTE (VoLTE), for conducting voice calls. VoLTE technology utilizes a fully packet-switched network and may provide benefits such as improved audio quality (e.g., HD voice) and simultaneous voice and data communications for CDMA carriers. Many operators around the world have deployed VoLTE technology and continue to enhance their VoLTE coverage, and operators have also begun to enable VoLTE roaming across their networks. However, LTE coverage is not ubiquitous. In some scenarios, e.g., due to low, lessening, or absent VoLTE service, it may be desirable or necessary to redirect a wireless device from an ongoing call using VoLTE technology to using a 2G/3G network.

Single Radio-Voice Call Continuity (SRVCC) provides a transitional mechanism whereby a VoLTE call may be seamlessly handed over to underlying 3G/2G coverage that uses circuit-switched communications. SRVCC is typically deployed by 3GPP carriers but not by 3GPP2 carriers, such as Verizon. Thus, in some scenarios users of 3GPP2 networks may be limited in their use of VoLTE systems due to incompatibility with SRVCC technology. Accordingly, improvements in wireless communications, specifically in the handling of VoLTE services, would be desirable. In particular, it would be desirable to improve the utilization of VoLTE technology in roaming scenarios by wireless device associated with non-SRVCC carriers.

SUMMARY OF THE INVENTION

In light of the foregoing and other concerns, some embodiments relate to one or more cellular network devices which are configured to better utilize packet-switched voice technologies, such as VoLTE, for roaming user equipment (UE) devices. The methods described herein may be particularly used with UEs associated with a telecom carrier that does not support handover from a packet-switched network to a circuit-switched network, e.g., which does not SRVCC.

In some embodiments, the cellular network may receive, in a wireless manner, a request from a roaming User Equipment (UE) to make a packet-switched wireless voice call, e.g., a VoLTE call. The cellular network may determine whether the UE is associated with a home cellular carrier that does not support handover from a packet-switched network to a circuit-switched network (does not support SRVCC). The cellular network may also determine information regarding probability of a handover of the wireless voice call from the packet-switched network to the circuit-switched network during the course of the call being set up.

If the cellular network determines that the UE is associated with a home cellular carrier that does not support packet-switched to circuit-switched handover, then the cellular network may selectively accept or reject the packet-switched wireless voice call based on the probability of a handover from the packet-switched network to the circuit-switched network during the wireless voice call. The probability of a PS to CS handover (e.g., an SRVCC handover) may be determined in any of various ways, and may be based on the amount or degree of packet-switched coverage in the current cell of the roaming UE as well as neighboring cells, e.g., such as in a tracking area of the UE, the degree of mobility of the roaming UE, etc.

The cellular network may provide wireless signaling to the UE rejecting the packet-switched wireless voice if the probability of a PS to CS handover is greater than a threshold, e.g., is high. The signaling may be configured to trigger the UE to fall back to a circuit-switched network and re-originate the wireless voice call on the circuit-switched network. As one example, the signaling rejecting the packet-switched wireless voice call may comprise a Session Initiation Protocol (SIP) cause code. If the probability of a handover of the wireless voice call from the packet-switched network to the circuit-switched network is low, or less than a threshold, the roaming carrier may provide signaling accepting the packet-switched wireless voice call.

In the case of a mobile terminated call received by the cellular network and intended for the roaming UE, the cellular network may perform similar operations, e.g., by determining whether the UE is associated with a home cellular carrier that does not support handover from a packet-switched network to a circuit-switched network and determining information regarding probability of such a handover during the voice call. If the UE is associated with a home cellular carrier that does not support PS to CS handover and if the probability of a PS to CS handover is high, the cellular network may provide signaling to the UE to perform a fallback to a circuit-switched network in order to receive the mobile terminated call.

In some embodiments, when a roaming UE first attempts to attach to a packet-switched network or perform a tracking area update (TAU), the cellular network selectively grants or denies access to the packet-switched network based on whether the roaming UE is associated with a home carrier that does not support PS to CS handover (SRVCC) and based on the amount of packet-switched (e.g., LTE) coverage in the tracking area of the roaming UE.

Accordingly, embodiments are presented herein of a method for determining usage of packet-switched networks for voice calls by roaming UEs, and a UE, base station, or other cellular networking hardware configured to implement the method. This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application:

UE: User Equipment
BS: Base Station
ENB: eNodeB (Base Station)
GSM: Global System for Mobile Communication
UMTS: Universal Mobile Telecommunication System
LTE: Long Term Evolution
CS: Circuit-switched
PS: Packet-switched
CSFB: Circuit-switched fallback
MME: Mobile Management Entity
MSC: Mobile Switching Center
RNC: Radio Network Controller
OAM: Operations, Administration, and Management
RRC: Radio Resource Control
MT: Mobile Terminating
MTRF: Mobile Terminating Roaming Forwarding Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, wearable devices (e.g., smart watch, smart glasses), or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
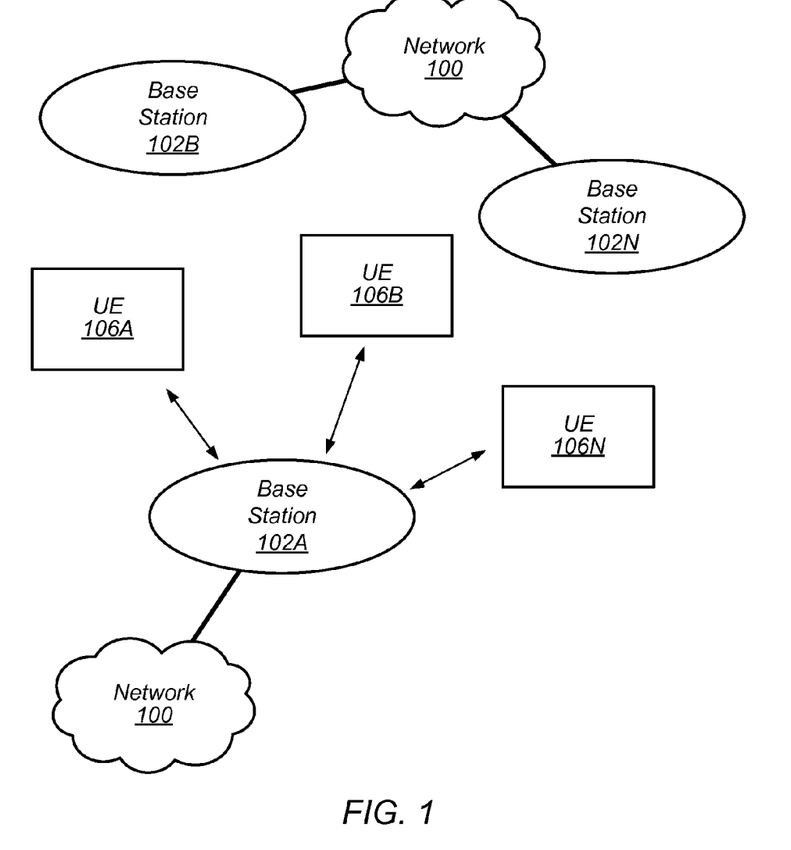
FIG. 1 illustrates an exemplary (and simplified) wireless communication system, according to some embodiments.
Figure 2:
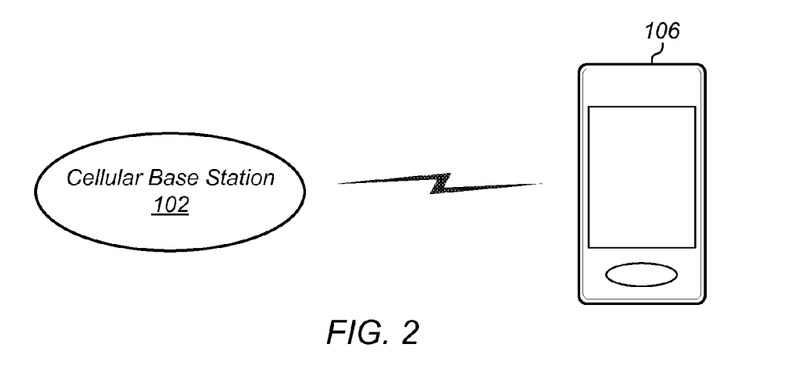
FIG. 2 illustrates a base station in communication with user equipment (UE), according to some embodiments.

FIGS. 1 and 2—Communication System

FIG. 1 illustrates a simplified example wireless cellular communication system, according to some embodiments. It is noted that the system of FIG. 1 is merely one example of a possible cellular communication system, and embodiments of the invention may be implemented in any of various systems as desired.

As shown, the example wireless cellular communication system includes a base station 102 which communicates over a transmission medium with one or more user devices 106A through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless cellular communication with the UEs 106A through 106N. The base station 102 may also be equipped to communicate with a network 100. Thus, the base station 102 may facilitate communication between the UEs and/or between the UEs and the network 100. The communication area (or coverage area) of each base station may be referred to as a "cell." The base station 102 and the UEs may be configured to communicate over the transmission medium using any of various wireless communication technologies, including cellular radio access technologies (RATs) such as GSM, UMTS, LTE, LTE-Advanced, CDMA, W-CDMA, and any of various 3G, 4G, 5G or future telecom standards. Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards. Other possible wireless communication technologies include wireless local area network (WLAN or WiFi), WiMAX, etc.

In some embodiments, UE 106 may be capable of communicating using multiple radio access technologies (RATs). For example, the UE 106 might be configured to communicate using two or more of GSM, UMTS, LTE, LTE-Advanced CDMA2000, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with the base station 102, according to some embodiments. As defined above, the UE 106 may be a device with wireless cellular network connectivity such as a mobile phone, a hand-held device, a computer or a tablet, or virtually any type of wireless device. The base station may be a cellular base station that communicates in a wireless cellular manner with one or more UEs. The base station may include a processing element such as one or more of a processor, an ASIC (application specific integrated circuit), an FPGA (field-programmable gate array) or some combination thereof.

The base station, such as the processing element in the base station, may perform any of the methods described herein, or any portion of any of the method embodiments described herein. Other cellular network devices, described below, may also be configured to perform some or all of the methods described herein, possibly in conjunction with the base station.

The UE may include a processing element such as one or more of a processor, an ASIC (application specific integrated circuit), an FPGA (field-programmable gate array) or some combination thereof. The UE, such as the processing element in the UE, may perform any of the methods described herein as being performed by a UE.

In some embodiments, the UE 106 may be configured to communicate using any of multiple wireless communication protocols as described above. The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. In other embodiments, the UE 106 may include separate transmit and/or receive chains (e.g., including separate antennas and other radio components) for each wireless communication protocol with which it is configured to communicate. In still other embodiments, the UE 106 may include one or more radios which are shared between multiple wireless communication protocols, and one or more radios which are used exclusively by a single wireless communication protocol. For example, in one set of embodiments, the UE 106 may include a shared radio for communicating using either of LTE or 1×RTT, and separate radios for communicating using each of Wi-Fi and Bluetooth. Other configurations are also possible.

In some embodiments, the UE 106 may be configured to communicate using either of a first radio access technology which provides packet-switched (PS) services but not circuit-switched (CS) services and a second radio access technology which provides PS services and CS services. If the UE 106 is using the first radio access technology and a CS call is initiated or received, the UE 106 may be capable of switching to use of the second radio access technology in order to establish the call.

The UE may be associated with, e.g., subscribe to, a cellular carrier. Examples of cellular carries in the United States include Verizon, AT&T, Sprint, and T-Mobile. In some embodiments, the UE may subscribe to a home carrier that does not support handover from packet-switched network to a circuit-switched network during an ongoing call.

Figure 3:
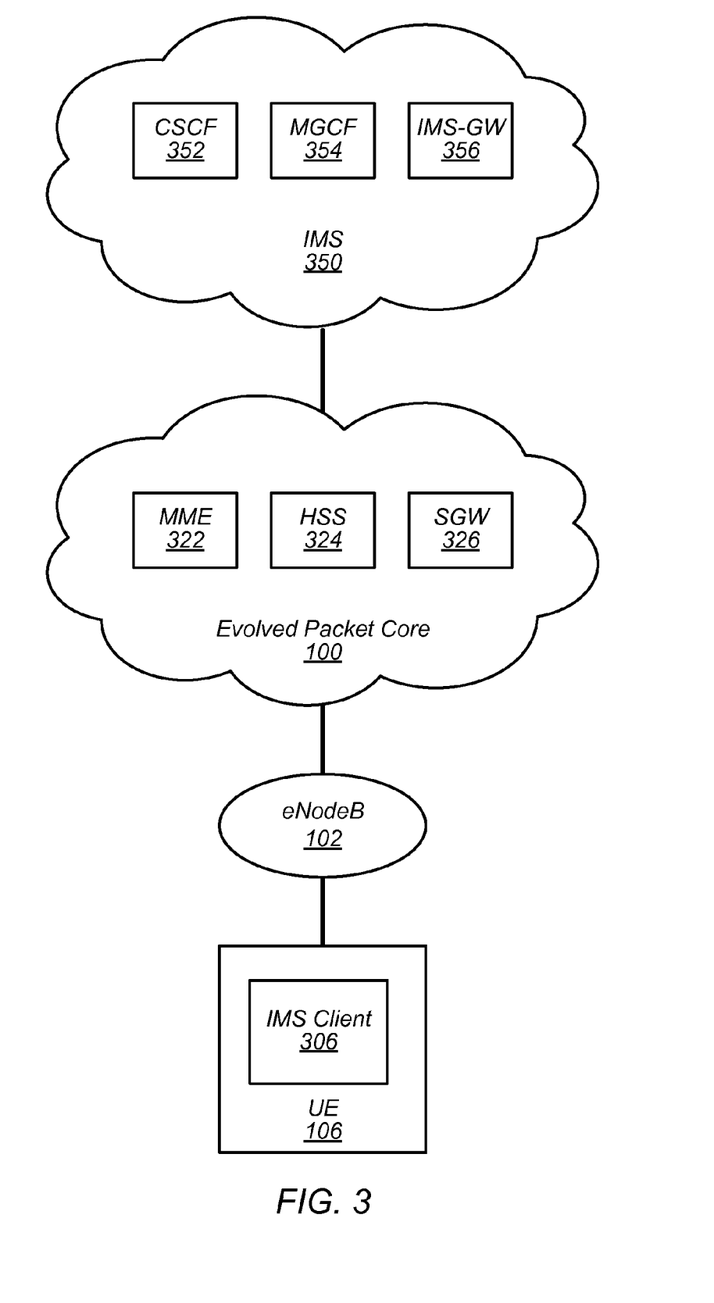
FIG. 3 illustrates an example cellular network system, according to some embodiments.

FIG. 3 illustrates an example simplified portion of a wireless communication system that may be particularly useful for implementing voice or video over IP communication, such as voice over LTE (VoLTE) in an LTE network, according to some embodiments. As shown, the UE 106 may include an IP multimedia subsystem (IMS) client 306, e.g., which may be implemented in various manners, using hardware and/or software. For example, in one embodiment, software and/or hardware may implement an IMS stack that may provide desired IMS functionalities, e.g., including registration, AKA authentication with IPSec support, session setup and resource reservations, etc.

The UE 106 may be in communication with a cellular network, where the cellular network may comprise a base station 102, an evolved packet core (EPC) 100 and an IMS system 350, as shown. The base station is shown in this example embodiment as an eNodeB 102. The UE 106 may communicate in a wireless manner with the base station (eNodeB) 102. In turn, the eNodeB 102 may be coupled to a core network, shown in this example embodiment as an evolved packet core (EPC) 100. As shown, the EPC 100 may include mobility management entity (MME) 322, home subscriber server (HSS) 324, and serving gateway (SGW) 326. The EPC 100 may include various other devices known to those skilled in the art as well.

The EPC 100 may be in communication with the IMS 350. The IMS 350 may include call session control function (CSCF) 352, which may itself include a proxy CSCF (P-CSCF), interrogating CSCF (I-CSCF), and serving CSCF (S-CSCF), as desired. The IMS 350 may also include media gateway controller function (MGCF) 354 and IMS management gateway (IMS-MGW) 356. Similar to the EPC 100, the IMS 350 may include various other devices known to those skilled in the art as well.

Operations described herein as being performed by the cellular network may be performed by one or more of the cellular network devices shown in FIG. 3, such as one or more of base station, 102, MME 322, HSS 324, or SGW 326 in EPC 100, or CSCF 352, MGCF 354 or IMS-GW 356 in IMS system 350, among possible others.

Figure 4:
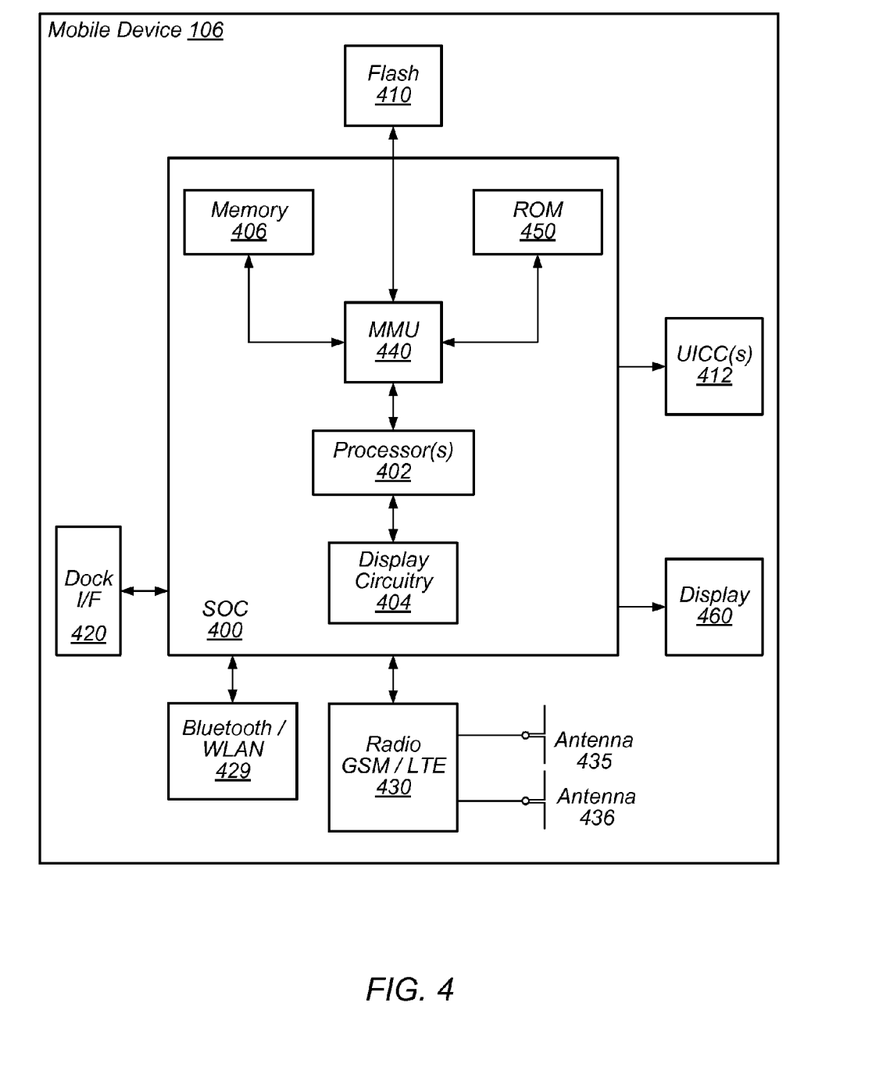
FIG. 4 illustrates an example block diagram of a UE, according to some embodiments.

FIG. 4—Example Block Diagram of a UE

FIG. 4 illustrates an exemplary block diagram of a UE 106, according to some embodiments. As shown, the UE 106 may include a system on chip (SOC) 400, which may include portions for various purposes. For example, as shown, the SOC 400 may include a processing element, such as processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, radio 430, connector OF 420, and/or display 460. The MMU 440 may be configured to perform memory protection and page table translation or set up. In some embodiments, the MMU 440 may be included as a portion of the processor(s) 402.

In the embodiment shown, ROM 450 may include a bootloader, which may be executed by the processor(s) 402 during boot up or initialization. As also shown, the SOC 400 may be coupled to various other circuits of the UE 106. For example, the UE 106 may include various types of memory (e.g., including Flash memory 410), a connector interface 420 (e.g., for coupling to the computer system), the display 460, and wireless communication circuitry (e.g., for LTE, LTE-A, CDMA2000, GSM, Bluetooth, WiFi, etc.).

The UE device 106 may include at least one antenna, and in some embodiments multiple antennas, for performing wireless cellular communication with base stations and/or wireless communication with other devices. For example, the UE device 106 may use antenna 435 to perform the wireless cellular communication and may use antenna 436 for other wireless communication. As noted above, the UE may be configured to communicate wirelessly using multiple wireless communication standards (multiple RATs) in some embodiments.

As described herein, the UE 106 may include a processing element, e.g., hardware and/or software components for implementing methods according to embodiments of this disclosure.

The processing element of the UE device 106 may be processor 402 configured to implement part or all of the methods described herein, e.g., by executing program instructions stored on a memory medium (e.g., a non-transitory computer-readable memory medium). In other embodiments, the UE processing element may be configured as a programmable hardware element, such as an FPGA (Field Programmable Gate Array), or as an ASIC (Application Specific Integrated Circuit).

Figure 5:
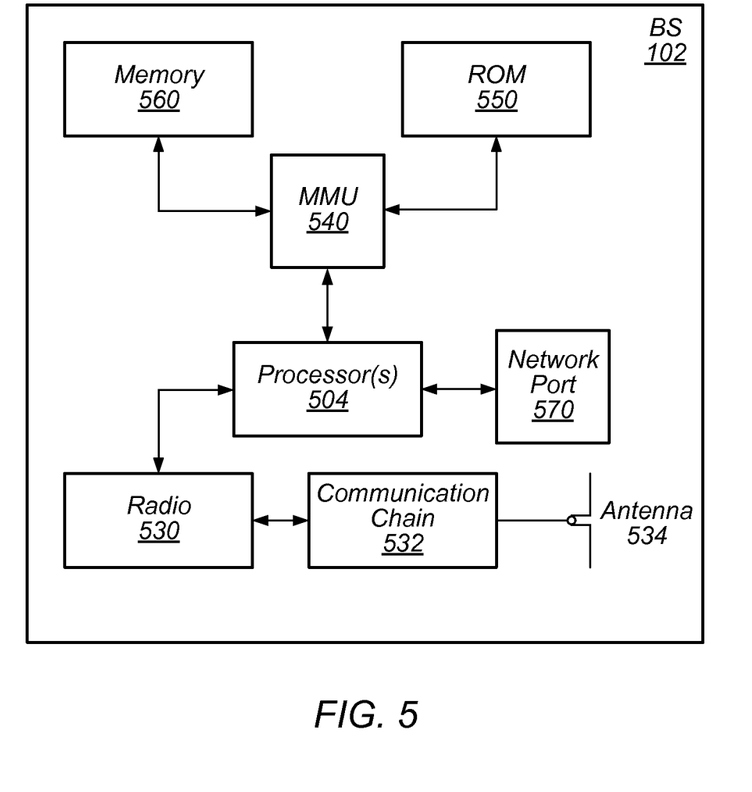
FIG. 5 illustrates an example block diagram of a base station, according to some embodiments.

FIG. 5—Base Station

FIG. 5 illustrates an exemplary block diagram of a base station 102, according to some embodiments. It is noted that the base station of FIG. 5 is merely one example of a possible base station. As shown, the base station 102 may include a processing element, such as processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, GSM, UMTS, LTE, LTE-A, WCDMA, CDMA2000, etc.

The processing element, such as processor(s) 504, of the base station 102 may be configured to implement part or all of the methods described herein, e.g., by executing program instructions stored on a memory medium (e.g., a non-transitory computer-readable memory medium). Alternatively, the processing element may be configured as a programmable hardware element, such as an FPGA (Field Programmable Gate Array), or as an ASIC (Application Specific Integrated Circuit), or a combination thereof.

Improved Voice Roaming

The UE may be associated with, e.g., subscribe to, a cellular carrier. Examples of cellular carries in the United States include Verizon, AT&T, Sprint, and T-Mobile. In some embodiments, the UE may subscribe to a home carrier that does not support handover from packet-switched network to a circuit-switched network during an ongoing call. More specifically, as one example the UE may subscribe to a home carrier that does not support SRVCC (Single Radio Voice Call Continuity). For example, some carriers, e.g., 3GPP2 carriers such as Verizon, may not support SRVCC technology. SRVCC is a process that enables handover of an existing phone call from use of packet data (or a packet-switched network) to circuit-switched data (or a circuit-switched network). For example, Single Radio Voice Call Continuity is a level of functionality that may be implemented within systems to enable packet domain calls on LTE to be handed over to legacy circuit-switched voice systems like GSM, UMTS and CDMA 1x in a seamless manner.

In some scenarios, a UE associated with such a non-SRVCC carrier (i.e., the home carrier) may be roaming, where the UE (referred to as the roaming device) may seek service from another carrier network (i.e., the roaming carrier), which may deploy packet-switched voice capabilities, such as LTE and VoLTE capabilities. Commonly in these scenarios the roaming device may be limited in its ability to utilize the VoLTE capabilities of the roaming carrier (the cellular network of the roaming carrier), as the roaming device, whose home carrier may not support SRVCC, may lack an efficient mechanism for transitioning ongoing voice calls from a packet-switched service, such as VoLTE, to a circuit-switched service. In some embodiments, the roaming carrier may not provide VoLTE roaming service to the roaming device unless certain stringent conditions are met to assure an optimal connection. These restrictions on the non-SRVCC device may serve to avoid scenarios wherein the VoLTE connection fails during an active voice call, which, because in this event the roaming device may be unable to use SRVCC to transition it to circuit-switched service, may cause the call to be dropped. These conditions or related limitations may keep the UE device of the non-SRVCC home carrier from enjoying the benefits of VoLTE while roaming. Thus, improved methods may be desired for determining when, whether, and/or how to provide VoLTE service to roaming UE devices associated with non-SRVCC home carriers. These methods may aim to improve the efficient utilization of VoLTE technology, which may provide benefits such as improved audio quality (e.g., HD voice) and simultaneous voice and data communications for CDMA carriers.

Figure 6:
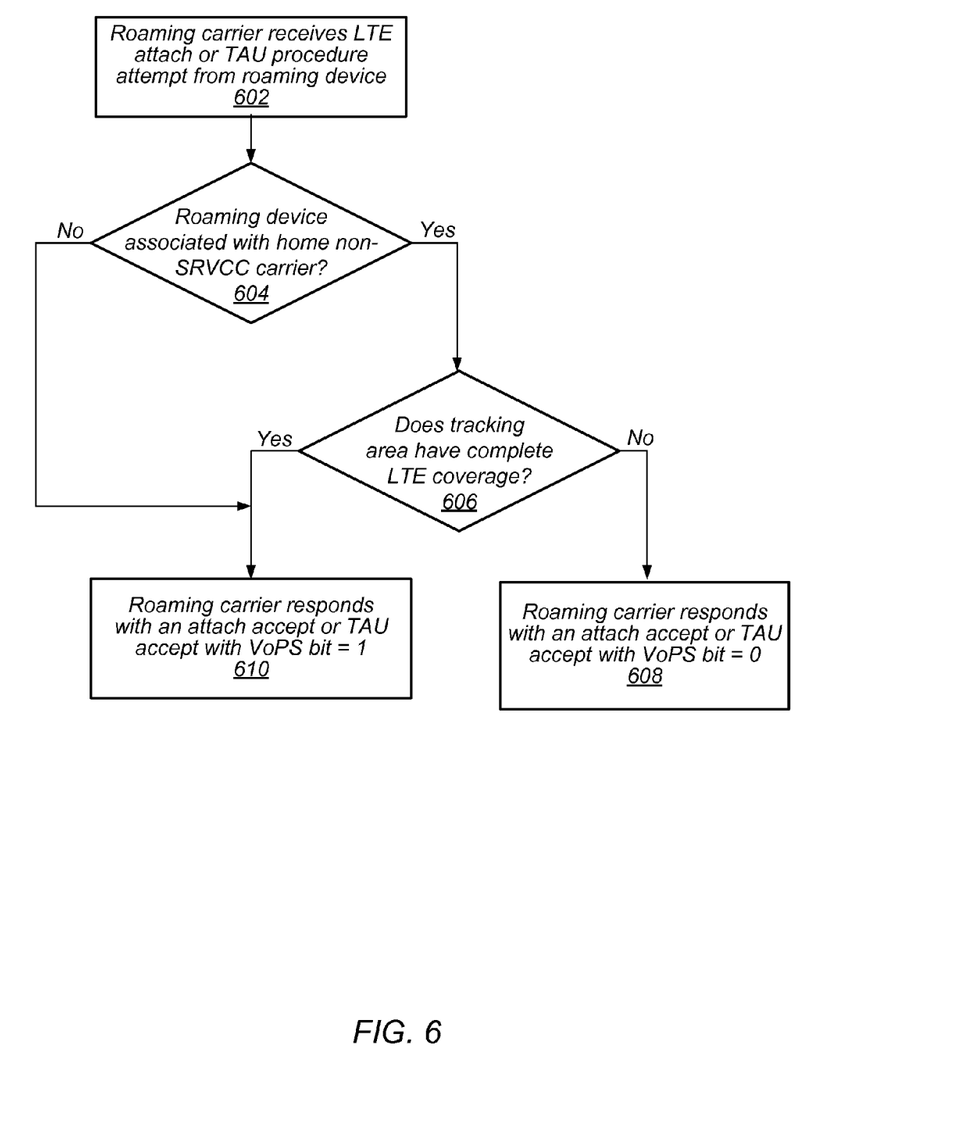
FIG. 6 is a flowchart diagram of a method by which a carrier network may determine to provide packet-switched voice service to a roaming device that is associated with a home non-SRVCC carrier, according to some embodiments.

FIG. 6—Providing Roaming VoLTE based on LTE Coverage

FIG. 6 illustrates an example method by which a carrier network, i.e., the roaming carrier, may determine to provide VoLTE service to a roaming device that is associated with a home non-SRVCC carrier, according to some embodiments. The steps in FIG. 6 may be performed by any of various devices in the cellular network of the roaming carrier, such as in the MME, base station, etc., or may be performed by some combination of these devices.

At 602 the roaming device (roaming UE) may attempt to perform a connection procedure, such as a packet-switched network attach (e.g., an LTE attach) or tracking area update (TAU) procedure, with the roaming carrier for the purpose of establishing a packet-switched connection with the roaming carrier. The requested packet-switched connection may be an LTE connection, an LTE-Advanced connection, or other similar type of packet based network. At 602, the roaming carrier may receive this communication from the roaming device. In other words, in 602 the roaming carrier may receive a packet-switched voice call attach or TAU procedure from the roaming UE.

At 604 the roaming carrier may determine whether the home carrier of the roaming device is capable of performing handover of active voice calls from a packet-switched network to a circuit-switched network. For example, the roaming carrier may determine whether the home carrier of the roaming device is compatible with (capable of) SRVCC. For example, the roaming carrier may examine an identifier value previously received from the roaming device, where this identifier value may specify the device's home carrier. The roaming carrier may use the identifier, possibly in conjunction with a stored data structure which indicates which carriers support SRVCC. This operation may be performed my any of various devices in the carrier network, such as an MME, a base station, or other network device.

If the roaming carrier determines that the roaming device subscribes to a home network which does not support packet-switched to circuit-switched voice handover (e.g., does not support SRVCC), then at 606 the roaming carrier may assess the tracking area of the roaming device and determine the degree of packet-switched coverage in the tracking area. For example, the roaming carrier may determine if the tracking area has packet-switched coverage greater than a certain threshold. Where the packet-switched network is LTE, the roaming carrier may determine if the tracking area has a degree of LTE coverage greater than a threshold. In one embodiment, the threshold may be set high, e.g., at 99% or even 100%, to determine if the tracking are has complete coverage. Other thresholds are also contemplated, e.g., such as any value between 90% and 100% inclusive. The carrier network may store information regarding packet-switched coverage in various tracking areas, such as in the MME or another device in the carrier network.

In response to the packet-switched attach or TAU procedure attempt received at 602, the roaming carrier may respond with an attach accept message (if the roaming device initiated a packet-switched, or LTE, attach procedure) or a TAU accept message (if the roaming device initiated a TAU procedure). This message may include information indicating whether the packet-switched network can be used, based on the determinations in 604 and 606, as discussed below.

If as determined in 606 the tracking area does not have sufficient packet-switched coverage, e.g., does not have complete LTE coverage in one embodiment, then at 608 the response of the roaming carrier (e.g., the attach accept or TAU accept message) may contain a voice over packet-switched (VoPS) bit of 0, which may indicate no provision of packet-switched service, e.g., no VoLTE service. Thus, for example, if the tracking area has LTE coverage lower than a desired threshold, e.g., if the LTE coverage does not entirely or sufficiently overlap with underlying 3G/2G coverage, the roaming carrier may determine not to provide VoLTE service and may respond with a VoPS bit of 0, as shown at 608. By necessitating complete or nearly complete LTE coverage prior to sending an affirmative VoPS indication, this method may limit the employment of VoLTE service to areas where handover to a circuit-switched network is unlikely. This may reduce the likelihood of such a handover in situations where a packet-switched to circuit-switched handover is not supported, thereby reducing the possibility of dropped voice calls.

If the tracking area has a high level of LTE coverage, e.g., near complete, complete or 100% LTE coverage, as determined in 606, the roaming carrier may determine to provide VoLTE service to the roaming device. In this case operation proceeds to 610, wherein the response of the roaming carrier (e.g., the attach accept or TAU accept message) may contain a voice over packet-switched (VoPS) bit of 1, which may indicate the provision of VoLTE service. Thus where the tracking area has sufficient packet-switched (LTE) coverage, the roaming carrier may allow the UE to attach or perform a TAU using the packet-switched (LTE) network.

If the roaming carrier determines at 604 that the roaming device subscribes to a home network which supports packet-switched to circuit-switched voice handover (SRVCC), then at 610 the roaming carrier may respond with an attach accept message or a TAU accept message voice over packet-switched (VoPS) bit of 1, which may indicate the provision of VoLTE service. Here the carrier of the roaming UE may support handover from a packet-switched to circuit-switched network, so the roaming UE can attach or perform a TAU with the packet-switched network. In this instance it may not be necessary for the carrier network to check the tracking area for packet-switched coverage.

In other embodiments alternative methods may be implemented to increase the utilization of VoLTE technology, as discussed below with respect to FIGS. 7 and 8.

Figure 7:
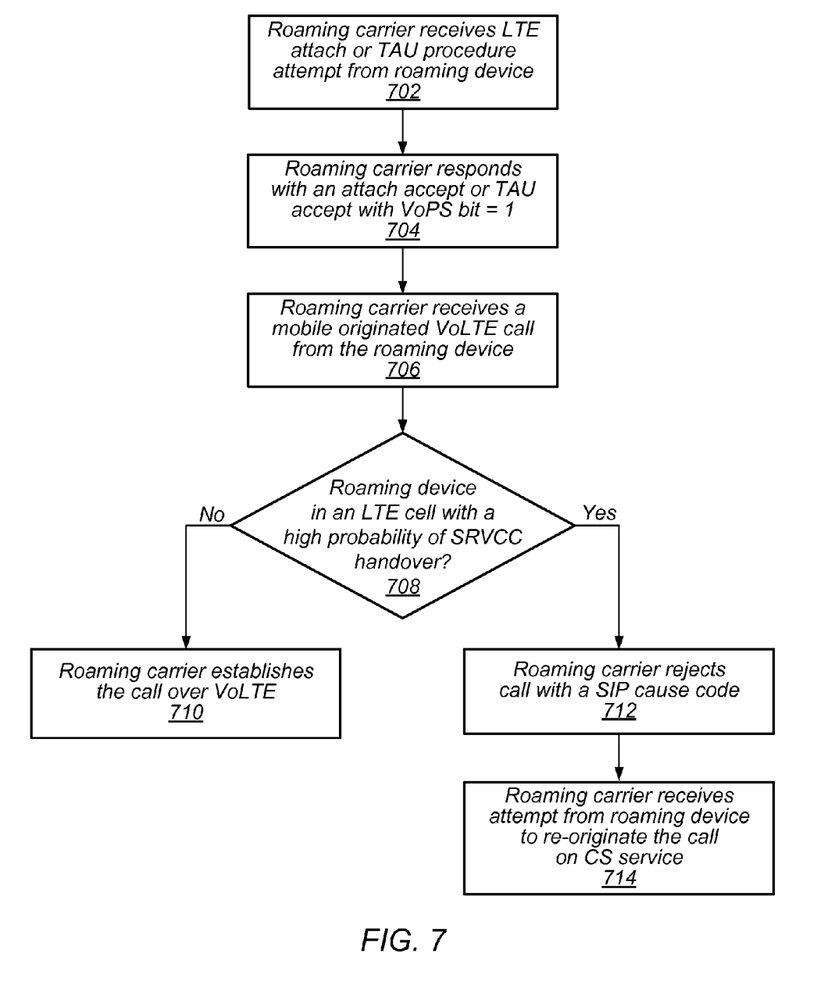
FIG. 7 is a flowchart diagram of a method by which a carrier network may determine to provide packet-switched voice service to a roaming device that is associated with a home non-SRVCC carrier for a mobile originated call, according to some embodiments.
Figure 8:
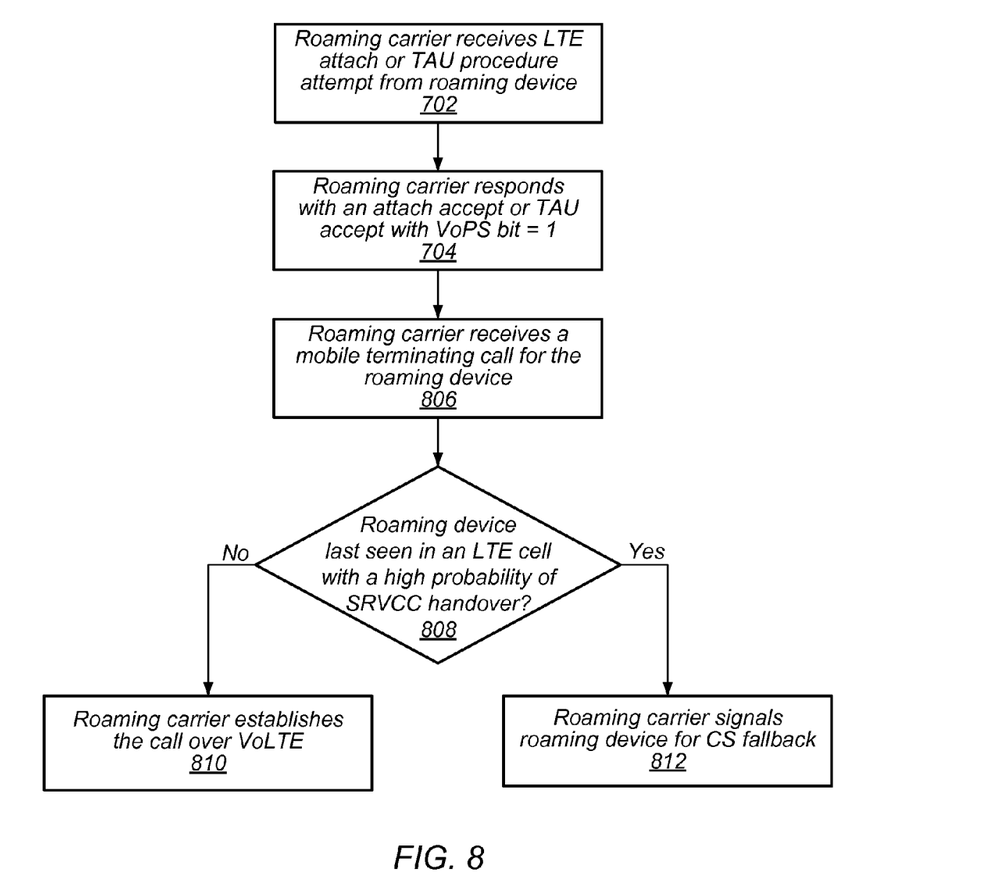
FIG. 8 is a flowchart diagram of a method by which a carrier network may determine to provide packet-switched voice service to a roaming device that is associated with a home non-SRVCC carrier for a mobile terminated call, according to some embodiments.

FIGS. 7 and 8—Providing Roaming VoLTE and CS Service for Voice Calls

FIGS. 7 and 8 illustrate example alternative methods whereby a roaming carrier may selectively provide packet-switched voice service (e.g., VoLTE service) to a roaming device associated a non-SRVCC home network, according to some embodiments. Upon the initiation of a voice call, the roaming carrier may determine whether to conduct the voice call with the roaming device over packet-switched (VoLTE) or circuit-switched (CS) service. FIG. 7 portrays a method for handling a VoLTE call originated by the roaming device, i.e., a mobile originated (MO) VoLTE call, while FIG. 8 portrays a method for handling a mobile terminated (MT) call targeting the roaming device. The following methods are described where the packet-switched network is an LTE network, but of course the methods described herein apply to any of various packet-switched networks, such as LTE, LTE-Advanced, etc.

The roaming device may first attempt to receive LTE service from the roaming carrier, e.g., from a carrier network of the roaming carrier. At 702 of FIG. 7, the roaming carrier may receive communications from the roaming device associated with an attempt to establish a connection, such as an LTE attach or TAU procedure.

At 704 the roaming carrier may respond accordingly, e.g., with an attach accept message (if the roaming device initiated an LTE attach procedure) or a TAU accept message (if the roaming device initiated a TAU procedure). The response may comprise an indication of VoLTE capabilities, e.g., a voice over packet-switched (VoPS) bit of 1. Thus, in some embodiments the roaming network may indiscriminately provide VoLTE service to the roaming device initially. In other words in the method of FIG. 7 the roaming carrier initially decides to provide access to the packet-switched network without making the determinations described in 604 and 606 of FIG. 6.

At 706 the roaming device may initiate a VoLTE call, i.e., a mobile originated (MO) voice call, which may be received by the roaming carrier. The roaming carrier may then determine whether to continue to use VoLTE to establish the call or otherwise to transition to using circuit-switched (CS) service.

As shown at 708 the roaming carrier may calculate and/or examine the probability of the roaming device experiencing a packet-switched to circuit-switched (e.g., SRVCC) handover during an ongoing voice call to decide whether to set up the call over VoLTE or CS service. The roaming carrier may assess or determine the probability of a SRVCC handover in a number of different ways. In some embodiments the roaming carrier may first determine if the roaming UE is associated with (e.g., subscribed to) a home network that does not support SRVCC as described above in 604 of FIG. 6. In one embodiment the roaming carrier may make the determinations described in both 604 and 606 of FIG. 6 to determine the probability of a SRVCC handover. If the amount of LTE coverage in the tracking area of the roaming device is less than a certain threshold, then the roaming device may be considered to have a high probability of SRVCC handover.

In some embodiments the determination in 708 may consider the packet-switched (e.g., LTE) coverage in the current cell in which the roaming UE is located as well neighboring cells in the UE's tracking area, and may weight the importance of the LTE coverage in these various cells based on certain factors. For example, cells farther away from the current cell in which the roaming UE is located may be weighted as less important in terms of LTE coverage than cells neighboring the current cell in determining the probability of SRVCC handover. Thus the degree or amount of packet-switched coverage in cells of the tracking area may be less important of a factor (may be weighted less in the determination) as the distance of these cells from the current location of the UE increases.

In some embodiments, the roaming carrier may consider the degree of mobility of the roaming UE device in weighting these neighboring cells. For example, for a highly mobile (fast moving) UE the neighboring cells may be weighted with greater importance with respect to their LTE coverage, whereas for a slow moving or stationary UE the neighboring cells may be weighted with less importance with respect to their LTE coverage. This difference in weighting may be based on the notion that a fast moving UE is more likely to cross over to a neighboring cell within the relevant time period, and thus the LTE coverage of these neighboring cells should be given more importance in assessing the probability of SRVCC handover, whereas a slow moving or stationary UE is less likely to cross over to a neighboring cell within the relevant time period, and thus for a slow moving UE the LTE coverage of neighboring cells is less important of a factor in the determination.

In some embodiments, the roaming carrier may consider both the degree of mobility of the roaming UE device as well as the direction of movement of the UE in weighting the packet-switched coverage of the neighboring cells. For example, for a fast moving UE that is known to be traveling in a specific direction (e.g., the UE is traveling on a highway), the neighboring cells that are this direction of movement may be weighted with greater importance with respect to their LTE coverage than other neighboring cells. Thus here the roaming carrier may factor in both the speed and direction of movement of the UE to estimate which cells the roaming UE is likely to enter, and may weight those cells higher, e.g., much higher, in terms of the importance of their LTE coverage, relative to other cells that are less likely entry points.

In some embodiments, the roaming carrier may also consider an estimated length of the voice call, which may be based on past statistics or heuristics. If the voice call is being placed with a called party where in the past such calls are typically short in duration, then this may lower the probability of an SRVCC handover.

Thus the determination of the probability of a packet-switched to circuit-switched handover (e.g., an SRVCC handover) may be based on a number of different factors, such as those described above, and/or may be based on other factors as well, such as time of day, network congestion, etc.

If SRVCC handover is determined to be unlikely or to have a probability lower than a threshold according to the determination in 708, then at 710 the roaming carrier may proceed to establish the call over VoLTE service. Thus, VoLTE capabilities may be leveraged if the roaming device is determined to be unlikely to lose VoLTE service during the call.

Conversely, if there is determined to be a high probability of SRVCC handover, e.g., the probability of SRVCC handover is greater than a certain threshold, operation proceeds to 712, wherein the roaming carrier may reject the MO call. In this instance the roaming device may be deemed likely to lose VoLTE coverage during the course of the voice call. This rejection message may comprise an SIP cause code, and may trigger the roaming device to fall back to CS service and re-originate the call using CS service rather than VoLTE service.

At 714 the roaming carrier may receive the new MO call attempt and proceed to establish the call over CS service. Thus, in some scenarios the roaming device may be provided with LTE service until a voice call is made; then, under (or lacking) certain conditions, the roaming device may fall back to CS service to conduct a desired voice call. If certain conditions are met such that the roaming device originating the voice call has a low probability of SRVCC handover, then the roaming device may be allowed to continue to use LTE service (VoLTE) to place the call.

FIG. 8 illustrates a similar example method by which the roaming carrier may provide VoLTE service to the roaming device and then determine whether to use VoLTE or CS service when an incoming call targeting the roaming device, i.e., a mobile terminated (MT) call, is received. In the method of FIG. 8, steps 702 and 704 may be performed as described above with respect to FIG. 7. At 806, after establishing a VoLTE connection with the roaming device (as described above in relation to 702 and 704), the roaming carrier may receive an indication of a mobile terminated (MT) call addressed for the roaming device. For example, the user of a second wireless UE may have initiated a voice call intended for the user of the roaming device.

The roaming carrier may then determine whether to establish the MT call over VoLTE service or to fall back to CS service. For example, at 808 the roaming carrier may examine the LTE cell in which the roaming device is determined to be operating, e.g., according to information earlier stored by the roaming carrier regarding its LTE cell. For example, the roaming carrier may solely examine the LTE cell in which the roaming device was last seen in determining the probability of SRVCC handover. Alternatively, the roaming carrier may also consider the cells in the tracking area of the roaming device, for example, using any of the various factors discussed with respect to step 708 of FIG. 7.

If the voice call being placed to the roaming device is determined to have a low probability of SRVCC handover (probability less than a threshold), then at 810 the roaming carrier may set up the call over VoLTE. However, if a high probability of SRVCC handover is determined (probability greater than a threshold), e.g., due to properties or conditions associated with the LTE cell, neighboring cells and/or the roaming device, then operation proceeds to 812. Here the roaming carrier may page the roaming device, indicating CS fallback. The MT call may then be established with the roaming UE over CS service.

The following paragraphs describe other embodiments:

In some embodiments, a cellular network system comprises: at least one base station comprising an antenna and a radio for performing cellular communications, wherein the at least one base station is configured to receive a request from a user equipment (UE) to make a packet-switched wireless voice call; at least one cellular network device coupled to the at least one base station, wherein the at least one cellular network device is configured to: determine that the UE is associated with a home carrier that does not support handover from a packet-switched network to a circuit-switched network; and determine information regarding probability of the handover from the packet-switched network to the circuit-switched network. The at least one base station is configured to provide signaling to the UE rejecting the packet-switched voice call, wherein said providing signaling to the UE rejecting the packet-switched voice call is performed in response to: 1) a determination by the at least one cellular network device that the UE is associated with the home carrier that does not support handover from the packet-switched network to the circuit-switched network; and 2) a determination that the probability of the handover from the packet-switched network to the circuit-switched network is greater than a threshold.

In some embodiments of the cellular network system, the signaling is configured to trigger the UE to fall back to the circuit-switched network and re-originate the wireless voice call on the circuit-switched network.

In some embodiments of the cellular network system, the at least one cellular network device comprises one or more of a mobile management entity (MME) or an IMS server.

In some embodiments, a method is performed by a cellular network, the method comprising: receiving, in a wireless manner, a mobile terminated call intended for a user equipment (UE), wherein the mobile terminated call is on a packet-switched wireless network; determining that the UE is associated with a home cellular carrier that does not support handover from a packet-switched network to a circuit-switched network; determining information regarding probability of a handover from the packet-switched network to the circuit-switched network; providing, in a wireless manner, signaling to the UE to perform a fallback to a circuit-switched network in order to receive the mobile terminated call, wherein said providing signaling to the UE to perform the fallback to the circuit-switched network is performed in response to said determining that the UE is associated with the home cellular carrier that does not support handover from the packet-switched network to the circuit-switched network and is based on the probability of the handover from the packet-switched network to the circuit-switched network during the wireless voice call.

In some embodiments of the method, said providing signaling to the UE to perform the fallback to the circuit-switched network is performed in response to determining that the UE was last identified on the packet-switched cell that has a high probability of handover from the packet-switched network to the circuit-switched network during the wireless voice call.

In some embodiments, the method further comprises: establishing the mobile terminated call with the UE over the packet-switched network in response to determining that the UE was last identified on a packet-switched cell that has a low probability of handover from the packet-switched network to the circuit-switched network during the wireless voice call.

In some embodiments of the method, the handover from the packet-switched network to the circuit-switched network comprises a single radio voice call continuity (SRVCC) handover.

In some embodiments, a cellular network system comprises: at least one cellular network device, wherein the at least one cellular network device is configured to receive, in a wireless manner, a mobile terminated voice call intended for a user equipment (UE), wherein the mobile terminated voice call is received on a packet-switched network; at least one base station coupled to the at least one cellular network device, wherein the at least one base station comprises an antenna and a radio for performing cellular communications, wherein the at least one base station is configured to provide, in a wireless manner, signaling to the UE to perform a fallback to a circuit-switched network to receive the mobile terminated voice call, wherein said providing signaling to the UE to perform the fallback to the circuit-switched network is performed in response to a determination that the UE is associated with a home cellular carrier that does not support handover from the packet-switched network to the circuit-switched network and is based on the probability of a handover from the packet-switched network to the circuit-switched network during the wireless voice call.

In some embodiments of the cellular network system, the at least one cellular network device is further configured to: determine that the UE is associated with the home cellular carrier that does not support handover from the packet-switched network to the circuit-switched network; and determine information regarding probability of handover from the packet-switched network to the circuit-switched network.

In some embodiments of the cellular network system, the at least one base station is further configured to: determine that the UE is associated with the home cellular carrier that does not support handover from the packet-switched network to the circuit-switched network; and determine information regarding probability of handover from the packet-switched network to the circuit-switched network.

In some embodiments of the cellular network system, the handover from the packet-switched network to the circuit-switched network comprises a single radio voice call continuity (SRVCC) handover.

In some embodiments, a base station comprises: at least one antenna; at least one radio coupled to the at least one antenna for performing wireless cellular communications; and at least one processing element coupled to the at least one radio; wherein the base station is configured to: provide, in a wireless manner, signaling to a user equipment (UE) to perform a fallback to a circuit-switched network to receive a mobile terminated wireless voice call, wherein said providing signaling to the UE to perform the fallback to the circuit-switched network is performed in response to a determination that the UE is associated with a home cellular carrier that does not support handover from a packet-switched network to the circuit-switched network and is based on the probability of handover from the packet-switched network to the circuit-switched network during the mobile terminated wireless voice call.

In some embodiments, a user equipment (UE) comprises: at least one antenna; at least one radio coupled to the at least one antenna for performing wireless cellular communications; and at least one processing element coupled to the at least one radio; wherein the UE is associated with a home cellular carrier that does not support handover from a packet-switched network to a circuit-switched network; wherein the UE is configured to: receive, from a base station, signaling to perform a fallback to the circuit-switched network to receive a wireless voice call, wherein said signaling to perform the fallback to the circuit-switched network is received by the UE in response to a determination that the UE is associated with the home cellular carrier that does not support handover from the packet-switched network to the circuit-switched network and is in response to a high probability of handover from the packet-switched network to the circuit-switched network during the wireless voice call; and receive, from a base station, a mobile terminated call on the packet-switched network in response to a determination of a low probability of handover from the packet-switched network to the circuit-switched network during the wireless voice call.

In some embodiments, a method is performed by a cellular network, the method comprising: receiving a request from a user equipment (UE) to attach to a packet-switched network, wherein the UE is in a first tracking area; determining that the UE is associated with a home cellular carrier that does not support handover from the packet-switched network to a circuit-switched network; determining an amount of packet-switched network coverage in the first tracking area; and providing signals to the UE indicating that the voice call should not be performed over the packet-switched network in response to the amount of the packet-switched network coverage in the tracking area being less than a threshold.

In some embodiments, a base station comprises: at least one antenna; at least one radio coupled to the at least one antenna for performing wireless cellular communications; and at least one processing element coupled to the at least one radio; wherein the base station is configured to: receive a request from a user equipment (UE) to attach to a packet-switched network, wherein the UE is in a first tracking area; providing signals to the UE indicating that the voice call should not be performed over the packet-switched network in response to a determination that the UE is associated with a home carrier that does not support handover from the packet-switched network to a circuit-switched network and in response to a determination that an amount of the packet-switched network coverage in the tracking area is less than a threshold.

In some embodiments, a user equipment (UE) comprises: at least one antenna; at least one radio coupled to the at least one antenna for performing wireless cellular communications; at least one processing element coupled to the at least one radio; wherein the UE is associated with a home cellular carrier that does not support handover from a packet-switched network to a circuit-switched network; wherein the UE is configured to: transmit a request to a base station to attach to a first packet-switched network to place a wireless voice call, wherein the UE is in a first tracking area; receive signals from the base station indicating that the wireless voice call should not be performed over the first packet-switched network in response to a determination that the UE is associated with the home cellular carrier that does not support handover from the packet-switched network to the circuit-switched network and in response to a determination that an amount of the packet-switched network coverage in the tracking area is less than a threshold.

Embodiments of the present disclosure may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method performed by a cellular network, the method comprising:
   receiving, in a wireless manner, a request from a user equipment (UE) to make a packet-switched wireless voice call;
   in response to receiving the request to make the packet-switched wireless voice call:
      determining that the UE is associated with a home cellular carrier that does not support handover of an active call from a packet-switched network to a circuit-switched network; and
      determining information associated with a likelihood of a handover of the packet-switched wireless voice call from the packet-switched network to the circuit-switched network, wherein said determining information associated with the likelihood of the handover comprises determining amount of packet-switched network coverage near the UE and determining information regarding mobility of the UE;
   providing, in a wireless manner, signaling to the UE rejecting the packet-switched wireless voice call, wherein said providing signaling to the UE rejecting the packet-switched wireless voice call is performed in response to said determining that the UE is associated with the home cellular carrier that does not support handover from the packet-switched network to the circuit-switched network and is based on the information associated with the likelihood of the handover from the packet-switched network to the circuit-switched network during the packet-switched wireless voice call.

2. The method of claim 1,
   wherein said providing signaling to the UE rejecting the packet-switched wireless voice call is performed in response to determining that the likelihood of the handover of the wireless voice call from the packet-switched network to the circuit-switched network is greater than a threshold.

3. The method of claim 1,
   wherein the signaling rejecting the packet-switched wireless voice call comprises a Session Initiation Protocol (SIP) cause code.

4. The method of claim 1,
   wherein the UE is in a first tracking area;
   wherein said determining the amount of packet-switched wireless network coverage comprises determining the amount of packet-switched wireless network coverage in the first tracking area.

5. The method of claim 1,
   wherein the handover from the packet-switched network to the circuit-switched network comprises a single radio voice call continuity (SRVCC) handover.

6. The method of claim 1,
   wherein the signaling is configured to trigger the UE to fall back to the circuit-switched network and re-originate the wireless voice call on the circuit-switched network.

7. The method of claim 1, further comprising:
   providing, in a wireless manner, signaling to the UE accepting the packet-switched wireless voice call in response to determining that the likelihood of the handover of the wireless voice call from the packet-switched network to the circuit-switched network is low.

8. The method of claim 1, further comprising:
prior to said receiving the request from the UE to make the packet-switched wireless voice call:
receiving, in a wireless manner, a request from the UE to attach to the packet-switched network of a carrier network, wherein the UE is roaming on the carrier network; and
in response to the request from the UE, communicating in a wireless manner to the UE that the UE should attach to the packet-switched network.

9. A base station, comprising:
at least one antenna;
at least one radio coupled to the at least one antenna for performing wireless cellular communications;
at least one processing element coupled to the at least one radio;
wherein the base station is configured to:
receive, in a wireless manner, a request from a user equipment (UE) to make a packet-switched wireless voice call;
in response to receiving the request to make the packet-switched wireless voice call, provide, in a wireless manner, signaling to the UE rejecting the packet-switched wireless voice call, wherein said providing signaling to the UE rejecting the packet-switched wireless voice call is performed in response to a determination that the UE is associated with a home cellular carrier that does not support handover of an active call from a packet-switched network to a circuit-switched network and that a likelihood of a handover from the packet-switched network to the circuit-switched network is greater than a threshold, wherein the likelihood of the handover is based on an amount of packet-switched network coverage near the UE and mobility of the UE;
wherein the signaling is configured to trigger the UE to fall back to the circuit-switched network and re-originate the wireless voice call on the circuit-switched network.

10. The base station of claim 9,
wherein the determination that the UE is associated with the home cellular carrier that does not support handover from the packet-switched network to the circuit-switched network is made by a cellular network device coupled to the base station.

11. The base station of claim 9,
wherein a determination that the likelihood of the handover from the packet-switched network to the circuit-switched network is greater than the threshold is made by a cellular network device coupled to the base station.

12. The base station of claim 9,
wherein the base station is configured to make the determination that the UE is associated with the home cellular carrier that does not support handover from the packet-switched network to the circuit-switched network.

13. The base station of claim 9,
wherein the base station is configured to determine whether the likelihood of the handover from the packet-switched network to the circuit-switched network is greater than the threshold.

14. The base station of claim 9,
wherein the UE is in a first tracking area;
wherein a determination that the likelihood of the handover from the packet-switched network to the circuit-switched network is greater than the threshold comprises a determination regarding the amount of packet-switched wireless network coverage in the first tracking area.

15. The base station of claim 9,
wherein the signaling rejecting the packet-switched wireless voice call comprises a Session Initiation Protocol (SIP) cause code.

16. The base station of claim 9,
wherein the handover from the packet-switched network to the circuit-switched network comprises a single radio voice call continuity (SRVCC) handover.

17. The base station of claim 9,
wherein the base station is further configured to:
provide, in a wireless manner, signaling to the UE accepting the packet-switched wireless voice call in response to a determination that the likelihood of the handover of the wireless voice call from the packet-switched network to the circuit-switched network is low.

18. A user equipment (UE), comprising:
at least one antenna;
a radio coupled to the at least one antenna for performing wireless cellular communications;
at least one processing element coupled to the radio;
wherein the UE is associated with a home cellular carrier that does not support handover of an active call from a packet-switched network to a circuit-switched network;
wherein the UE is configured to:
transmit, in a wireless manner, a request to a base station to make a packet-switched wireless voice call;
receive, in a wireless manner, signaling from the base station rejecting the packet-switched wireless voice call, wherein the signaling rejecting the packet-switched wireless voice call is received from the base station in response to a determination that the UE is associated with the home cellular carrier that does not support handover from the packet-switched network to the circuit-switched network and is based on information associated with a likelihood of a UE handover from the packet-switched network to the circuit-switched network being greater than a threshold, wherein the information associated with the likelihood of a UE handover comprises an amount of packet-switched network coverage near the UE and information regarding mobility of the UE.

19. The UE of claim 18,
wherein the UE is further configured to fall back to the circuit-switched network and re-originate the wireless voice call on the circuit-switched network in response to receiving the signaling from the base station rejecting the packet-switched wireless voice call.

20. The UE of claim 18,
wherein the UE handover from the packet-switched network to the circuit-switched network comprises a single radio voice call continuity (SRVCC) handover.

* * * * *